United States Patent
Chan et al.

[11] Patent Number: 5,830,831
[45] Date of Patent: Nov. 3, 1998

[54] SURFACTANT BLENDS FOR WELL OPERATIONS

[75] Inventors: Albert F. Chan, Plano; Kieu T. Ly, Richardson, both of Tex.

[73] Assignee: Atlantic Richfield Company, Los Angeles, Calif.

[21] Appl. No.: 746,790

[22] Filed: Nov. 15, 1996

Related U.S. Application Data

[62] Division of Ser. No. 439,162, May 11, 1995, abandoned.

[51] Int. Cl.$^6$ .............................. C09K 7/02; E21B 33/13
[52] U.S. Cl. ..................... 507/211; 507/261; 507/269; 507/927; 507/928; 507/933; 166/293
[58] Field of Search ................. 507/211, 261, 507/269, 927, 928, 933; 166/293

[56] References Cited

U.S. PATENT DOCUMENTS

| | | | |
|---|---|---|---|
| 4,856,589 | 8/1989 | Kuhlman et al. | 507/211 |
| 4,985,154 | 1/1991 | Balzer et al. | 507/211 |
| 5,164,116 | 11/1992 | Berkhof et al. | 507/211 |
| 5,221,343 | 6/1993 | Grauer et al. | 106/729 |
| 5,374,361 | 12/1994 | Chan | 507/211 |
| 5,458,197 | 10/1995 | Chan | 507/211 |
| 5,466,746 | 11/1995 | Geck et al. | 524/837 |
| 5,627,144 | 5/1997 | Urfer et al. | 507/211 |

*Primary Examiner*—Philip Tucker
*Attorney, Agent, or Firm*—Michael E. Martin

[57] ABSTRACT

Blends of alkyl polyglycoside surfactants having an alkyl chain length of C11 to C16 and blends of alkyl polyglycoside surfactants, in the presence of an ethoxylated alcohol cosurfactant, will form Winsor type III microemulsions in a water-oil mixture in a hydrophile-lipophile balance range of at least about 9.8 to 10.8 at 130° F. wherein the water may be a chloride brine. The compositions are particularly useful in oil and gas well cleanout operations, formation acidizing, and well cementing operations and provide superior cleaning ability for removal of oil based drilling fluids, hydrocarbons and oil based pipe sealant and lubricant compositions, for example.

17 Claims, 3 Drawing Sheets

SURFACTANT BLENDS FOR WELL OPERATIONS

This is a divisional of application Ser. No. 08/439,162 filed on May 11, 1995, now abandoned.

BACKGROUND OF THE INVENTION

Field of the Invention

The present invention pertains to compositions of and a method for providing blends of non-ionic, alkyl polyglycoside surfactants and non-ionic alkyl polyglycoside surfactants together with linear ethoxylated alcohol cosurfactants, which form improved Winsor type III microemulsions, and are particularly useful in wellbores operations.

Background

The failure to perform an effective cleanout operation during drilling or workover of an oil or gas well, or an acidizing treatment of a formation interval, or establish a bond between a cement composition and a wellbore wall or a casing or tubing can, each, cause unwanted results in oil and gas well operations. For example, failure to perform an effective cleanout operation during drilling or workover of an oil well can result in contamination and plugging of an earth formation from which fluids are desired to be produced. Moreover, during acidizing treatment of an earth formation to make the formation more productive, if oil based contaminants enter the formation interval and are not removed therefrom the effectiveness of the acidizing treatment can be substantially reduced. Still further, ineffective cleaning of a wellbore wall, including a casing, liner or tubing string, can result in a poor cement bond during cementing operations thereby allowing unwanted flow of fluids along the wellbore or a failure to stabilize the casing in the wellbore. The cost of remedial action for any of the above-mentioned failures can be substantial in both onshore and offshore well operations. Moreover, contamination of a formation interval with unwanted oil based materials can be ruinous.

My U.S. Pat. No. 5,374,361, issued Dec. 20, 1994, is directed to providing an improved method of removing oil based material from a wellbore using a washing composition having an alkyl polyglycoside surfactant comprising 1.0% to 10.0% by weight of the composition together with a cosurfactant selected from a group consisting of linear alkyl ethoxylate and alkyl phenol ethoxylate. Still further, my U.S. patent application Ser. No. 08/148,736, filed Nov. 5, 1993, now U.S. Pat. No. 5,458,197 is directed to improved cleanout systems for wellbores using alkyl polyglycoside surfactants. Notwithstanding the improvements in well cleanout operations described and claimed in the above-referenced patent documents, there has been a need to provide a cleanout composition which has suitable characteristics for solubilizing substantially all of the oil based materials expected to come into contact with the composition. Moreover, this solubilization characteristic should be substantial while providing a range of a hydrophilic-lipophilic balance of the composition to be as broad as possible, since, for example, the salinity of fluids present in a well and an adjacent earth formation may vary considerably. Accordingly, the range of the microemulsion formed by the surfactant solution, as a function of the hydrophile-lipophile balance (HLB) is desired to be made as broad as possible.

Alkyl polyglycoside surfactants in electrolyte solutions having a pH of about 4.0 or less show improved wettability, suspension of contaminant particles and solubilization of oily coatings on surfaces. The acidic nature of cleaning solutions of this type is such as to also show a distinct capability of dissolving carbonate and calcite scales and iron oxide. On the other hand, solutions of alkyl polyglycoside surfactants, in combination with caustic materials such as sodium hydroxide and potassium hydroxide, are also particularly effective in removing oil based drilling fluids, pipe thread sealant and lubricant materials and other oil based contaminants found in wellbores, including diesel oil, mineral oil, synthetic oils and crude oil as well as other naturally occurring hydrocarbon substances. Alkyl polyglycoside surfactants remain very surface active at relatively high pH and therefore can be used effectively as wetting, dispersing and/or emulsifying agents in a caustic environment, such as encountered in cement slurries, for example. Moreover, alkyl polyglycoside surfactants have a superior hydrogen bonding capability as compared with ethoxylated alcohols because the alkyl polyglycoside surfactants remain active at relatively high temperatures, up to about 350° F., for example.

The oil soluble portion of alkyl polyglycoside surfactants may be controlled by the alkyl chain length which can be varied from about C4 to about C20. Each saccharide group is believed to be equivalent to five to seven ethylene oxide groups and is therefore very effective in rendering water soluble properties to alkyl polyglycoside surfactants even at high temperatures and the high salinity and hardness conditions found in sea water and subsurface brines, for example. Moreover, since oil, brine and the above-mentioned contaminants are usually present in an oil well, for example, it is desirable to provide an alkyl polyglycoside composition for well cleanout and formation interval decontamination, which exhibits very low interfacial tension and forms a Winsor type III microemulsion over the broad temperature ranges typically encountered in both shallow and deep oil and gas wells.

Still further, since the salinity of fluids present in a well may vary considerably, the range of the microemulsion formed by a surfactant composition, as a function of the hydrophile-lipophile balance (HLB) is, as mentioned previously, desired to be made as broad as possible. Additionally, the breadth of the middle-phase or Winsor type III microemulsion, as a function of the HLB number is also desired to be made as broad as possible.

Although alkyl polyglycoside surfactants have become popular in various cleaning compositions, primarily directed to institutional and household detergent products which are not exposed to the extremes encountered in wellbore cleanout processes, these surfactants have been developed with relatively short alkyl chain lengths from C4 to C12, for example, or with relatively long chain lengths such as C16 to C18. The compositions with the shorter alkyl chain lengths act as good hydrotropes or wetting agents and the compositions with the longer alkyl chain lengths have good emulsifying properties, but none of these commercially available compositions, used alone, are deemed optimal for conditions wherein a relatively broad range of salinity of wellbore fluids and a relatively broad operating temperature range are encountered. Accordingly, there has been a pressing need to develop improvements in alkyl polyglycoside surfactants used generally in the methods and systems described in my earlier patents as well as in other well operations and related activities wherein oil based contaminants commonly found in wells are present and should be removed.

SUMMARY OF THE INVENTION

The present invention provides an improved surfactant composition, particularly useful in well operations, including wellbore cleanout, cementing, and formation interval acidizing, in connection with the production of oil and gas from such wells. The surfactant composition is particularly adapted for removal of oil based drilling fluids, pipe thread sealant and lubricant materials, crude oil and other organic or oil based materials present in wellbores and near formation intervals during drilling and completion processes.

The present invention also provides an improved cement composition including a surfactant which is operable to remove oil based materials from wellbore walls, including pipe and tubing surfaces and to improve the surface wetting of cement slurry components for enhancement of cement hydration and bonding to such surfaces.

The present invention also provides an improved acidizing composition for improving the productivity of a formation interval penetrated by an oil or gas well.

Still further, the present invention provides a unique method for developing a surfactant composition which is particularly useful in the above-mentioned well operations.

In accordance with an important aspect of the invention, well treatment compositions have been developed which are based on blends of alkyl polyglycoside surfactants which produce an improved interfacial tension characteristic, or solubilization properties, coupled with the ability to form a middle-phase or Winsor type III microemulsion over a broad range of temperatures and salinity conditions found in wellbore fluids and in conjunction with wellbore operations.

In accordance with another aspect of the invention, surfactant compositions have been developed which provide a Winsor type III microemulsion, that is a microemulsion that co-exists with both oil and water or brine, and which is made up of at least two commercially available alkyl polyglycoside surfactants or such surfactants together with a cosurfactant, such as a linear ethoxylated alcohol.

The present invention provides specific surfactant compositions which are stable over a wide range of temperature and salinity conditions encountered during certain well operations.

Still further, the invention contemplates a unique method for providing a surfactant composition particularly useful in well operations which is made up of one or more commercially available surfactant compositions and which, combined, provide improved ranges of solubilization parameter and hydrophile-lipophile balance for the operations contemplated.

Those skilled in the art will further appreciate the above noted aspects of the invention together with other superior features thereof upon reading the detailed description which follows in conjunction with the drawing.

DESCRIPTION OF PREFERRED EMBODIMENTS

Figure 5:
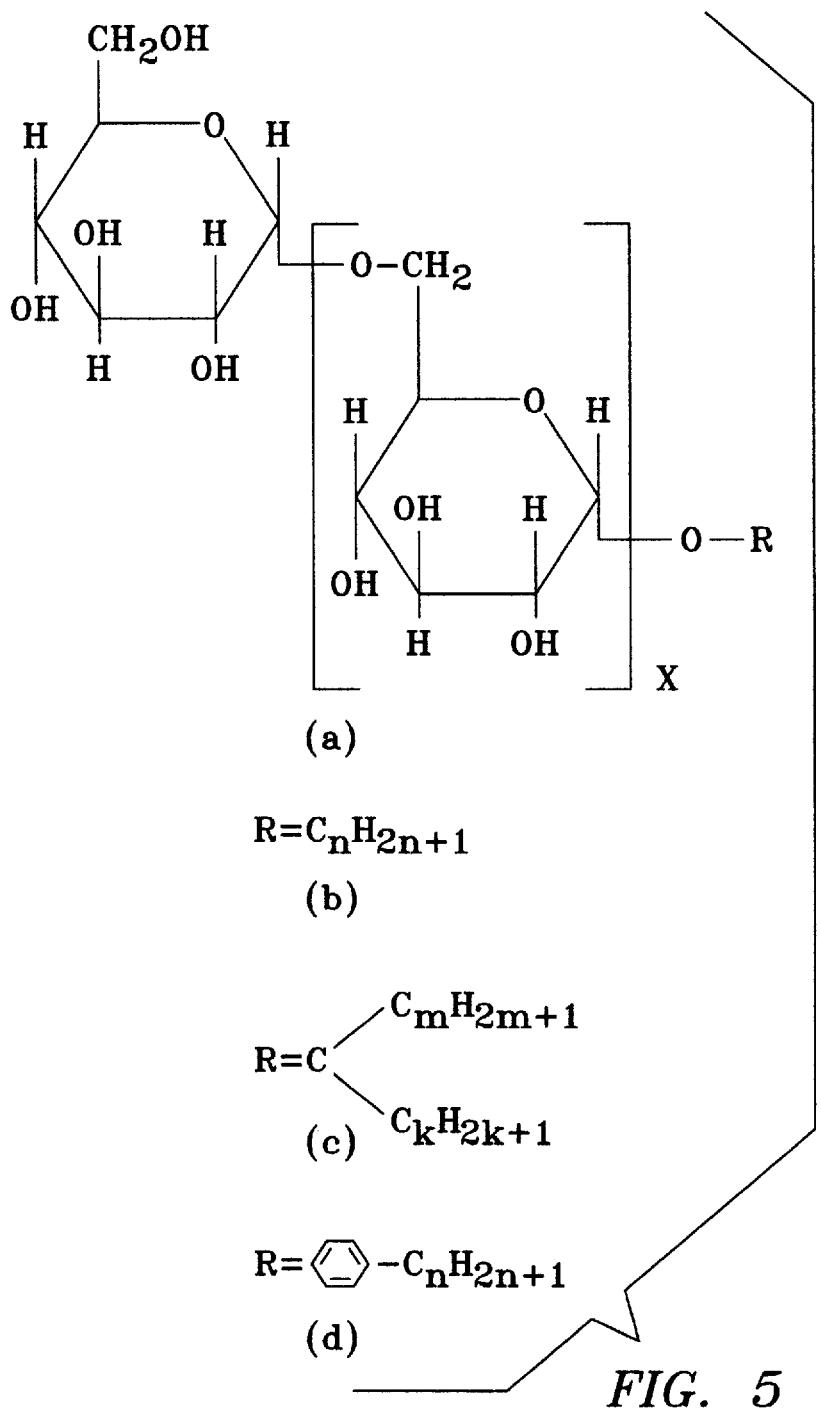
FIG. 5 is a diagram of the molecular structure of alkyl polyglycoside.

Alkyl polyglycoside surfactants consist of a polar glucose head and an organic carbon chain off of the hemiacetal linkage. A representation of the molecule is shown in FIG. 5(a). There are two ether oxygens and three hydroxyl groups per glucose unit, plus a terminal hydroxyl group. The lipophilic portion of the molecule resides in the alkyl chain wherein R can be a linear alkyl chain, as indicated in FIG. 5(b), and wherein n preferably ranges from 4 to 20. Alternatively, R can be a branched alkyl chain, as indicated in FIG. 5(c), wherein m and k are odd or even numbers and m is equal to k+2, or an alkyl phenol chain as indicated in FIG. 5(d). The polymerization reaction can provide oligomer distributions from x=0 to x=10.

Generally, alkyl polyglycoside surfactants have substantially higher cloud points than ethoxylated alcohols. Moreover, ethoxylated alcohol surfactants are subject to a narrowing of the Winsor type III microemulsion range and a shifting of the HLB number to a higher value with temperatures normally encountered in wellbore operations (for example, 60° F. to about 350° F.). In this regard surfactant solutions which comprise substantially ethoxylated alcohols have not been highly successful in completely cleaning out a wellbore to remove oil based drilling fluids as well as hydrocarbon based pipe sealants and lubricants which remain in a well in significant quantities upon completion of the installation of the casing as well as the production or working tubing strings. It has been determined that the removal of these materials from the wellbore usually improves fluid production from an oil well, in particular.

It is not unusual that the fluid remaining in a wellbore upon completion of the drilling and casing installation process can contain a significant amount of brine. Accordingly, when the cleaning process is to be carried out it is also desirable to provide a cleaning solution which is stable over a relatively wide range of temperatures, is tolerant of both caustic and acidic fluid compositions which may be used to facilitate the cleaning process and is tolerant of a relatively wide range of salinity of the fluids to be displaced from the well. The compositions in accordance with the present invention exhibit stable HLB number and a Winsor type III or so-called middle-phase microemulsion which actually expands its breadth, as a function of HLB number with increasing temperature rather than decreasing in breadth. Winsor type III or middle-phase microemulsions are discussed in more detail in "Micellization, Solubilization, and Microemulsions", Volume 2, K. L. Mittal, Plenum Press, New York, 1977.

Moreover, alkyl polyglycoside surfactants have been discovered to provide superior wetting of particulate components of cement slurries and the like. This wettability agency characteristic of alkyl polyglycoside surfactants enhances the completeness of hydration of the cement particles and thereby generates greater strength and better bonding of the cement to the wellbore walls. In accordance with the invention, an alkyl polyglycoside composition is selected which will provide a Winsor type I microemulsion in a Winsor type III phase environment system. In other words, the invention contemplates the provision of an alkyl polyglycoside surfactant blend that will produce a middle-phase microemulsion within a particular range of hydrophile-lipophile balance number and this HLB number will then be increased by modifying the blend to provide a lower phase or Winsor type I microemulsion. These blended alkyl polyglycoside surfactants of higher HLB number will then be used for wetting applications such as inclusion in a cement slurry and the like.

The present invention contemplates that linear alkyl ethoxylated alcohol cosurfactants may be provided in the surfactant composition wherein the alcohol alkyl chain length varies from C6 to C18 and the ethylene oxide groups in combination with the alkyl chain lengths provide an HLB number in the range of about 4.0 to 11.0.

In developing a surfactant composition in accordance with the present invention the solubilization parameter, which is described hereinbelow, for solubilizing substantially all oil in the environment in which the composition is to be used, does not require to be any greater than that which can be determined by testing a sample of the fluid to be cleaned or removed from the area in question. This may be predetermined by determining the concentration of oil based materials, for example, in drilling fluid returns, or by determining the concentration of oil contaminants in a formation to be acidized (from a core sample of the formation material), or by determining the concentration of oil in the fluid occupying the well annulus to be cemented by an improved cement composition including an alkyl polyglycoside surfactant in accordance with the invention. When the optimum solubilization parameter has been determined then a blend of surfactants which will provide that solubilization parameter and minimum interfacial tension in a middle-phase microemulsion is provided from data such as that presented in FIGS. 1 through 4 of the drawing.

The HLB number used in the diagrams of FIGS. 1 through 4 is a "pseudo" HLB number (PHLB) which is derived by multiplying the molar fraction of each surfactant in the surfactant composition by its HLB number and summing the results to arrive at the "pseudo" HLB number. For example, if surfactant (a) has an HLB of 12.0 and is present in the composition as 0.80 moles then its contribution to the HLB number is 9.6 and if surfactant (b) has an HLB number of 10.0 and is present in the composition as 0.20 moles then its contribution to the HLB number is 2.0, providing a combined "pseudo" HLB number of 11.6.

The solubilization parameter described herein may be determined by providing a known quantity of oil together with a known quantity of surfactant and water, mixing the two thoroughly and then measuring the amount of type III microemulsion occupying the volume previously occupied by oil and previously occupied by the water and surfactant solution. The volume of oil or water now occupied by the microemulsion after mixing divided by the volume of active surfactant composition in the water (or brine) and surfactant solution determines the values of the solubilization parameters for oil (SPo) and for water (SPw), respectively.

It is contemplated that a surfactant composition having a blend of at least two alkyl polyglycoside surfactants or a blend of at least two alkyl polyglycoside surfactants and a linear ethoxylated alcohol described herein, wherein the total concentration of the surfactant in an aqueous solution is about 0.5% to 10% by weight, will be capable of forming a type III microemulsion in a temperature range of about 60° F. to 350° F. The total concentration of surfactant as well as the blend of alkyl polyglycoside surfactants and linear ethoxylated alcohol surfactant will be dependent on the concentration of oil based material to be removed from a site being treated.

The surfactant composition may comprise a blend of two alkyl polyglycoside surfactants capable of forming a type III microemulsion. The blend of the two surfactants may be tailored to the need for wettability versus emulsification. For example, as discussed hereinbefore, wettability of cement particles in a cement slurry may be more important than emulsifying oil contaminants in a wellbore or in the cement composition. Moreover, the HLB number may be modified by blending the two alkyl polyglycoside surfactants in proportions which will give the desired HLB. For wettability, a higher proportion of a short alkyl chain length alkyl polyglycoside may be used in the surfactant composition. For example, a composition having an alkyl chain length of C4 having an HLB number of 16.3 may be mixed with an alkyl polyglycoside having a chain length of C11 and an HLB 12.4. Alternatively, an alkyl polyglycoside surfactant having an alkyl chain length of C4 or C11 may be blended with a blend of alkyl polyglycosides of alkyl chain lengths of C12, C14 and C16, said blend having an HLB 11.7, These surfactant compositions are capable of forming a middle-phase or type III microemulsion with a solubility in water and oil which can be maximized at a particular HLB. For example, a mixture of 50% by weight of each of an alkyl polyglycoside surfactant having an alkyl chain length of C11 and an HLB of 12.4 with an alkyl polyglycoside having an HLB of 11.7 would yield a composition with an HLB of 12.06, Such a composition will produce a middle-phase or type III microemulsion with good solubilization parameter values at higher temperatures than the aforementioned blends. An HLB range that provides a type I microemulsion may then be selected and the surfactant blend quantities adjusted accordingly.

Figure 1:
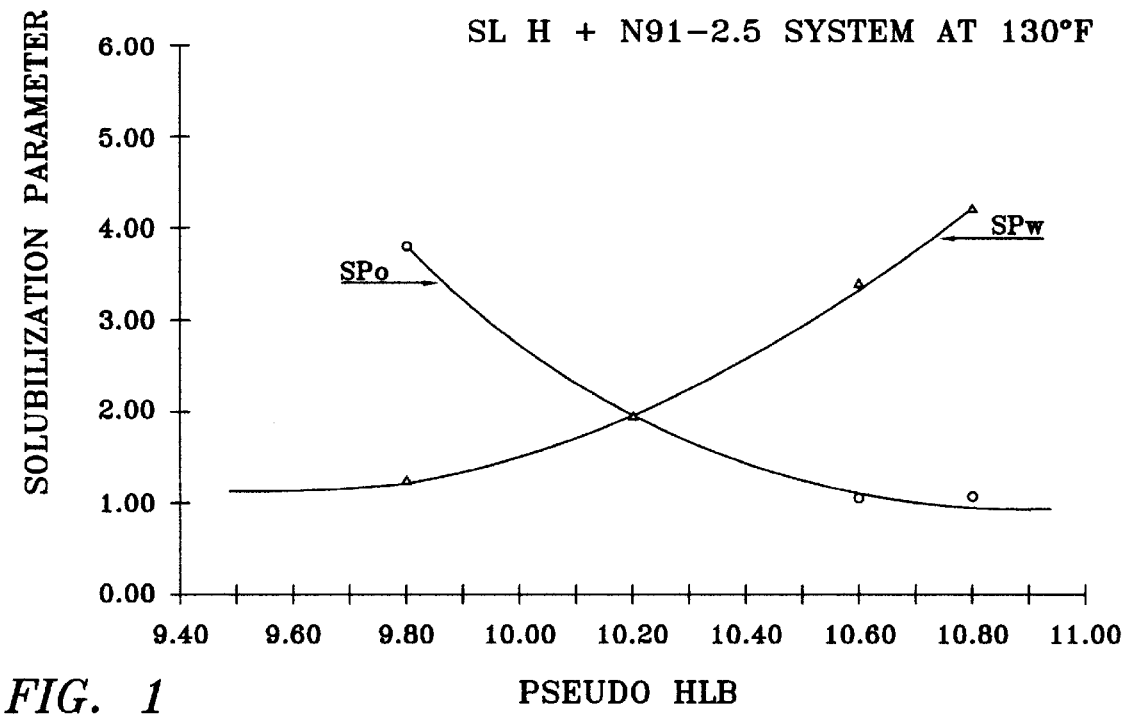
FIGS. 1 through 4 are diagrams showing the solubilization parameters of oil and water as a function of a pseudo hydrophile-lipophile balance (PHLB) number for a type III microemulsion for several exemplary surfactant compositions in accordance with the invention.

FIG. 1 illustrates a diagram of the solubilization parameter versus the PHLB number for one preferred surfactant solution in accordance with the invention and characterized by an alkyl polyglycoside surfactant having an alkyl chain length of C11 together with a linear alkyl ethoxylated alcohol cosurfactant wherein the total surfactant concentration was 3.63% by weight in an aqueous solution which also contained 2.76% by weight calcium chloride. Various concentrations of alkyl polyglycoside and ethoxylated alcohol were tested to provide the pseudo HLB (PHLB) numbers indicated while the total concentration of surfactant was held at 3.63%. In each of the tests shown in FIGS. 1 through 4, the composition was 80% water, surfactant and calcium chloride by volume and 20% oil as indicated by the designation 80:20 in the drawing. The solubilization test was carried out at a temperature of 130° F. The "oil" was a synthetic organic drilling fluid base (hereinafter sometimes referred to as the EMN fluid) made up of commercially available compositions including an oil wetting agent sold under the trade name Novamod, an emulsifier sold under the trade name Novamul and a synthetic oil sold under the trade name Novasol. The Novamod, Novamul and Novasol compositions were provided in the ratio of 1:4:82 by weight. The above-mentioned compositions are commercially available from MI Drilling Fluids, Inc., Houston, Tex. The cosurfactant was a linear ethoxylated alcohol having an alkyl chain length of C9 to C11. A commercial cosurfactant meeting the specification was used and is sold under the trade name Neodol 91-2.5 by Shell Chemical Company, Houston, Tex. The Neodol 91-2.5 cosurfactant has an HLB number of 8.5.

The composition of FIG. 1 exhibited a Winsor type III microemulsion for a range of PHLB of from 9.8 to 10.8 and an optimum solubilization parameter of about 1.99 at the intersection of the curves representing solubility in oil and water, respectively, and at a PHLB of 10.20. The alkyl polyglycoside surfactant used is manufactured and sold under the trade name Simulsol SL 11 by Seppic, Inc., Fairfield, N.J. The Simulsol SL 11 surfactant has an alkyl chain length of C11 and an HLB of 12.4. Simulsol SL 11 surfactant is a non-ionic cleanser primarily developed for household cleaning applications.

Figure 2:
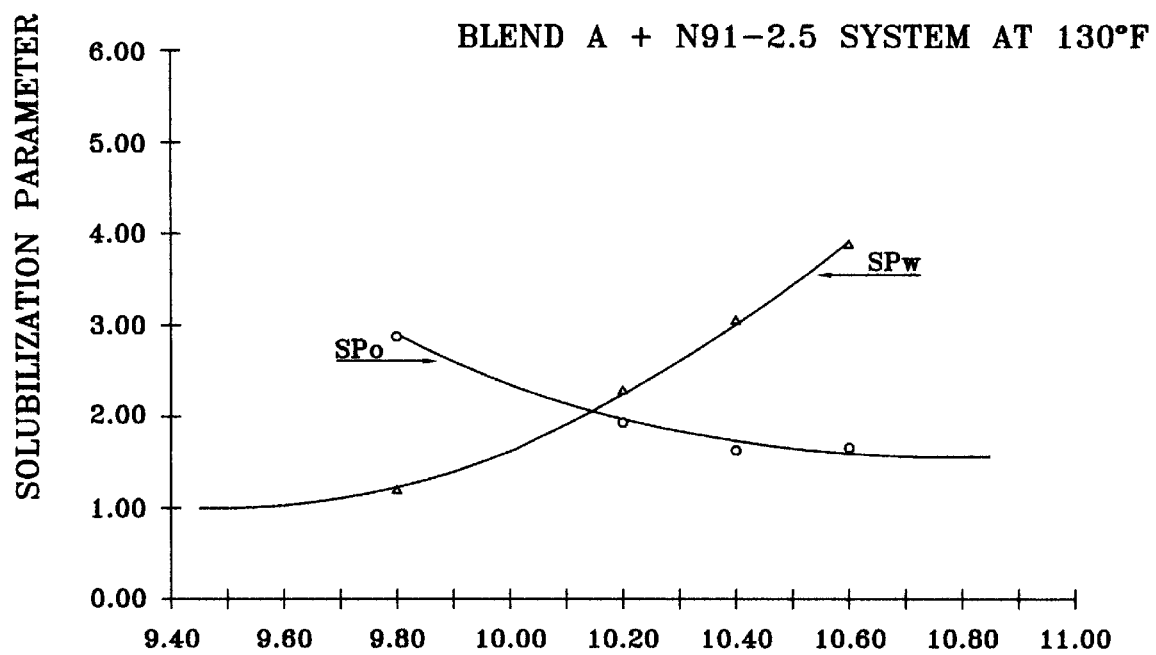

Referring now to FIG. 2, there is illustrated a diagram similar to FIG. 1 showing the solubilization parameter of oil and water as a function of the PHLB number for a surfactant composition totaling 3.63% by weight of a solution of water and calcium chloride wherein the content of calcium chloride is about 2.76% by weight. The surfactant in the solution was characterized by a mixture of alkyl polyglycoside and ethoxylated alcohol surfactants wherein the alkyl polyglycoside surfactant comprised 80% of an alkyl polyglycoside such as the Simulsol SL 11 surfactant and 20% of an alkyl polyglycoside surfactant, also developed by Seppic, Inc. under their designation Simulsol SL 26 and in itself being characterized by a blend of alkyl chain lengths of C12, C14 and C16, respectively, wherein about 65% to 70% of surfactant of alkyl chain length C12 was typically present. The alkyl polyglycoside surfactant blend in FIG. 2 carries the designation Blend A. The SL 26 surfactant has an HLB of 11.7, which is, effectively, a pseudo HLB, and giving the Blend A surfactant a PHLB of 12.27. The cosurfactant was, as indicated, the Neodol 91-2.5 ethoxylated alcohol. The total solution comprised 80% of water with surfactant and calcium chloride and 20% EMN fluid, by volume, and the values derived in FIG. 2 are also based on tests at 130° F. FIG. 2 indicates that a PHLB range of 9.8 to 10.6 was achievable for a Winsor type III microemulsion and that the optimal solubilization of 2.08 occurred at a PHLB number of 10.15.

Figure 3:
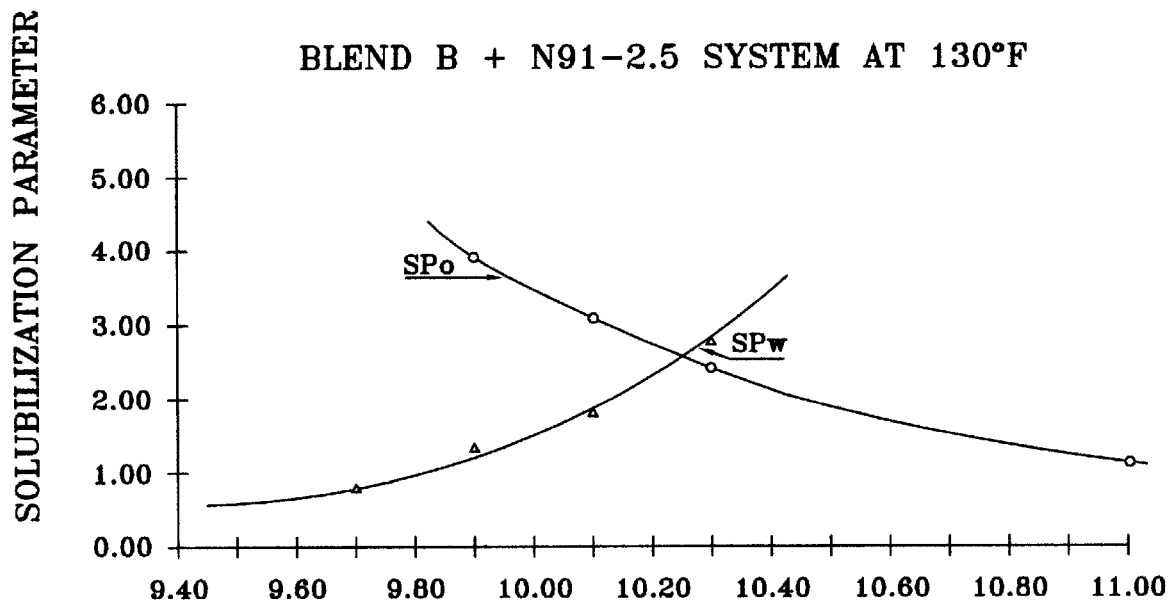

Still further as shown in FIG. 3, a surfactant Blend B comprised of 60% Simulsol SL 11 surfactant and 40% Simulsol SL 26 surfactant, provided as the alkyl polyglycoside component, together with the ethoxylated alcohol, Neodal 91-2.5 cosurfactant, totaling 3.63% by weight, was provided in a solution which comprised 2.76% calcium chloride and wherein the surfactant blend and calcium chloride were mixed in water providing a solution which was 80% by volume of the total mixture whereas 20% of the volume was the EMN fluid. As shown in FIG. 3, the Winsor type III microemulsion existed between 9.9 PHLB and 10.4 PHLB and an optimum solubilization of 2.47 occurred at PHLB 10.26. These tests were also carried out at 130° F.

Figure 4:
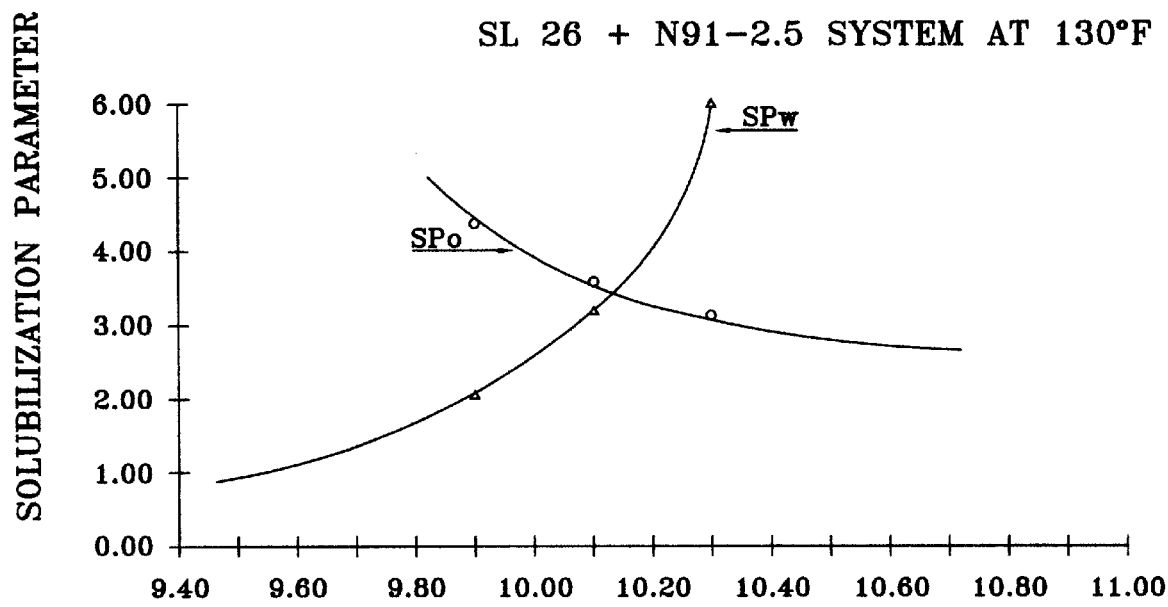

Looking now at FIG. 4, a microemulsion was obtained with the Seppic Simusol SL 26 surfactant together with the ethoxylated linear alcohol, Neodol 91-2.5, provided in a total amount of 3.63% in the aqueous calcium chloride solution at 130° F. FIG. 4 indicates that the type III microemulsion existed in a range of PHLB number from 9.9 to 10.3 and an optimum solubilization of about 3.62 was obtained at a PHLB of 10.14. The alkyl polyglycoside surfactant in the test shown in FIG. 4 was 100% of the commercially available surfactant SL26 made up of alkyl chain lengths C12, C14, and C16, previously described.

These solutions could also be useful in applications such as pipeline cleaning or pigging operations and as gravel packing fluids for wells, for example. Moreover, the present invention contemplates that the alkyl polyglycoside surfactant compositions described and claimed herein may be used in applications including so-called spacer fluids, corrosion inhibitor enhancement fluids, wetting additives in cement slurries, as foaming agents and other cleaning operations associated with hydrocarbon production and transport.

Accordingly, from the foregoing description, it will be appreciated that a unique surfactant composition has been developed characterized by an alkyl polyglycoside composition which may be made up of one or more specific alkyl chain length surfactants together with a cosurfactant such as a linear ethoxylated alcohol or blends of two or more alkyl polyglycoside surfactants, and further wherein the concentration of the two surfactants is adjusted to improve the wetting properties or provide an optimum solubilization parameter in both water and oil in a middle-phase or type III microemulsion, over a broad range of so-called pseudo hydrophile-lipophile balance numbers. These surfactant compositions are particularly useful for wellbore cleanout operations wherein the salinity and temperature extremes to which the cleanout composition is exposed will not result in degradation of the composition or loss of its effectiveness.

It is contemplated that the surfactant compositions described herein may be included in a wellbore operation such as acidizing a formation interval adjacent to a wellbore and from which formation fluids are desired to be produced. For example, acidizing operations are typically carried out to improve formation productivity by first injecting a "bank" of an ammonium salt based brine such as ammonium chloride brine wherein the concentration of ammonium chloride is in the range of about 1.0% to 5.0% by weight. This solution is injected as a so-called preflush solution into the formation interval through the well from which production fluids will eventually be produced. The second step is to inject an acid solution such as a weak, acetic or formic acid solution having a concentration of 1.0% to 15.0%. Alternatively, or in addition, a strong acid solution such as hydrochloric acid in the range of 1.0% to 15.0% concentration may also be injected after or in place of the weak acid solution.

However, conventional acidizing treatments do not adequately dissolve oil based compositions of the type described herein. In this regard, it is contemplated that an acidizing treatment may be carried out wherein, during the injection of the acid solution, a quantity of surfactant composition of the type described herein may be included in the aqueous acid solution in the range of about 0.5% to 10.0% by weight of the surfactant blend including one or more of those described hereinabove.

Still further, the compositions of the present invention may be used in conjunction with well cementing operations by including one or more of the above-mentioned alkyl polyglycoside surfactants as a blend or as one of those commercially available together with the linear ethoxylated alcohol cosurfactant. The total concentration of surfactant should be, by weight, from 0.1% to 5.0% when used as a wetting agent for the solids particulates in the slurry, or from 0.5% to 10% when used primarily as a solubilizing agent, of the total aqueous phase in a cement composition including a cementitious material selected from a group consisting of Portland cement, slag, calcium carbonate, calcium aluminate, calcium sulfate and magnesium/calcium oxide. As the cement composition is pumped into the wellbore and flows along the wellbore wall, including the wall surfaces of casing, liner or tubing, any oil based material residing on the wall surfaces such as residual deposits of drilling fluid, for example, will be solubilized by the surfactant to improve cement bonding to the surface.

Those skilled in the art will further appreciate that the above described blended surfactant compositions are produced by a unique method of providing a composition which has a middle-phase or type III microemulsion with a solubility in water and oil which can be maximized at a particular HLB number or (pseudo HLB number) and wherein a significant solubility in both water and oil can be obtained to provide the type III microemulsion over a fairly broad range of hydrophile-lipophile balance number. By selectively varying the concentration of an alkyl polyglycoside surfactant and a linear ethoxylated alcohol surfactant in an aqueous solution or as a concentrate in an acid solution or a cement material, improved wellbore operations of the types described herein-above may be realized.

Selected alkyl polyglycoside surfactants and linear ethoxylated alcohol surfactants are prepared in an aqueous solution, which may include a chloride brine, such as calcium chloride, and a quantity of an oil or organic fluid which exhibits properties of oil and tested to determine when a type III microemulsion is present for a calculated HLB number and a solubility parameter as described above is ascertained for the type III microemulsion for a given HLB number. The concentration of alkyl polyglycoside and linear ethoxylated alcohol surfactant is then varied, respectively, while maintaining the total concentration of surfactant constant until a type III microemulsion fails to develop.

In each instance, it is contemplated that an optimum or balanced solubilization of oil and water may be achieved within the type III microemulsion range, such as evidenced by the sample compositions described and illustrated in FIGS. 1 through 4, If a requisite solubilization has been predetermined, as indicated by the amount of oil based material present in the fluid to be displaced from a well, or pipeline or other cleaning operation, the blend of alkyl polyglycoside surfactant and the concentration of the alkyl polyglycoside surfactant and the linear ethoxylated alcohol surfactant may be, respectively, preselected to meet the solubilization needed. This should be done while maintaining as broad a range of PHLB number as possible in order to provide acceptable cleaning at variable temperature and salinity conditions existing in the well or the earth formation interval being treated.

Although preferred embodiments of the invention have been described in detail herein those skilled in the art will recognize sat certain modifications may be made without departing from the scope and spirit of the invention as recited in the appended claims.

What is claimed is:

1. A method for cleaning oil based contaminants from a wellbore using a surfactant composition having a predetermined solubilization in fluids comprising oil and water in the wellbore and wherein said surfactant composition is made up of a first surfactant consisting essentially of an alkyl polyglycoside and a second surfactant consisting essentially of at least one of an alkyl polyglycoside and a linear ethoxylated alcohol, comprising the steps of:

(a) determining the concentrations of the first surfactant and the second surfactant which will provide said predetermined solubilization by mixing a known volume of oil together with a known volume of a solution of surfactant composition and one of water or brine, measuring the volume of a type III microemulsion occupying a volume previously occupied by the oil and measuring the volume of said microemulsion previously occupied by said water or brine and surfactant solution;

(b) varying the concentrations of the first and second surfactants, respectively, in said solution and repeating step (a) until said predetermined solubilization is provided in a range of concentration of said first surfactant and said second surfactant which forms said microemulsion; and, (c) circulating a solution containing a concentration of the first surfactant and the second surfactant having the predetermined solubilization through the wellbore to remove oil based contaminants therefrom.

2. The method set forth in claim 1 wherein:

said surfactant composition is provided in a range of 0.5% to 10.0% by weight of the first surfactant and the second surfactant, collectively, in said solution.

3. The method set forth in claim 1 including the step of:

providing said first surfactant and said second surfactant in concentrations which provide a pseudo hydrophile-lipophile balance of said solution in a range of at least 9.8 to 10.8 and a solubilization of said surfactant composition in oil and water of about at least 1.99 at a temperature of about 130° F.

4. The method set forth in claim 3 wherein:

the solubilization of said surfactant composition in oil and water is determined by dividing the volume of oil occupied by the microemulsion and the volume of water or brine occupied by the microemulsion by the volume of the surfactant composition in said solution.

5. The method set forth in claim 1 including the steps of:

injecting an acid solution containing a quantity of said first surfactant and said second surfactant in a concentration which will provide said predetermined solubilization into an earth formation interval to solubilize oil based materials disposed therein.

6. In an acidizing operation for improving the productivity of a subterranean earth formation interval adjacent to a well, the improvement characterized by:

injecting an acid solution into said earth formation interval through said well, said acid solution comprising an aqueous solution of an acid selected from a group consisting of acetic acid, formic acid and hydrochloric acid in a concentration of 1.0% to 15.0% by weight, and a surfactant composition in said acid solution consisting essentially of a first surfactant consisting essentially of an alkyl polyglycoside having an alkyl chain length of C11 to C16 and a second surfactant consisting essentially of at least one of an alkyl polyglycoside and a linear ethoxylated alcohol and said surfactant composition is present in said solution in a range of 0.5% to 10% by weight; and injecting said acid solution with said surfactant composition into said formation interval to dissolve at least portions of said formation interval and solubilize oil-based substances in said formation interval.

7. The method set forth in claim 6 including the step of:

selecting said first surfactant and said second surfactant to provide a surfactant composition having a predetermined solubilization of oil and of water.

8. A method for improving the wetting action and hydration of cementitious material in a cement composition for a cementing operation in a well including the steps of:

providing a cement composition comprising a cementitious material selected from a group consisting of Portland cement, slag, calcium carbonate, calcium aluminate, calcium sulfate, and magnesium/calcium oxide, water and a surfactant composition comprising a first surfactant characterized by an alkyl polyglycoside having an alkyl chain length of C11 to C16 and a second surfactant comprising an alkyl polyglycoside wherein the concentration of the first surfactant and the second surfactant together in said water is 0.1% to 5.0% by weight and the concentration of the surfactants provides at least one of a type I and type III microemulsion in the presence of both water and oil; and injecting said cement composition into said well.

9. A method for improving cement bonding in a cementing operation in a well including the steps of:

providing a cement composition comprising a cementitious material selected from a group consisting of Portland cement, slag, calcium carbonate, calcium aluminate, calcium sulfate and magnesium/calcium oxide, water and a surfactant composition consisting essentially of a first surfactant characterized by an alkyl polyglycoside having an alkyl chain length of C11 to C16 and a second surfactant consisting essentially of at least one of an alkyl polyglycoside and a linear ethoxylated alcohol wherein the concentration of the first surfactant and the second surfactant together in said water is 0.5% to 10.0% by weight and the concentration of the surfactants provides a type III microemulsion in the presence of both water and oil; and injecting said cement composition into said well to dissolve oil-based materials present on the surfaces of the wellbore wall and any structures disposed in said well coming into contact with said cement composition to improve the bonding of said cement composition to said surfaces.

10. The method set forth in claim 9 wherein:

the solubilization of water and oil in said surfactant composition is about at least 1.99 in a hydrophile-lipophile balance range of at least about 9.8 to 10.8 at a temperature of about 130° F.

11. The method of claim 1 wherein the first surfactant is selected from the group consisting of at least one alkyl polyglycoside having an alkyl chain length from about 4 to about 11 carbon atoms and an oligomer distribution from 0 to 10.

12. The method of claim 1 wherein the second surfactant is selected from the group consisting of at least one alkyl polyglycoside having an alkyl chain length from about 12 to about 16 carbon atoms and alkyl phenols.

13. The method set forth in claim 11 wherein:

from about 65 to about 75 percent of said first surfactant contains alkyls having a chain length of 12.

14. The method set forth in claim 11 wherein:

said surfactant is a mixture of alkyl polyglycosides having an alkyl chain length of C11 and a mixture of alkyl polyglycosides having alkyl chain lengths of C12 to C16.

15. A method for using a surfactant composition having a predetermined solubilization in oil and water and wherein said surfactant composition is made up of a first surfactant comprising an alkyl polyglycoside and a second surfactant comprising at least one of an alkyl polyglycoside and a linear ethoxylated alcohol, comprising the steps of:

(a) determining the concentrations of the first surfactant and the second surfactant which will provide said predetermined solubilization by mixing a known volume of oil together with a known volume of a solution of surfactant composition and one of water or brine, measuring the volume of a type III microemulsion occupying a volume previously occupied by the oil and measuring the volume of said microemulsion previously occupied by said water or brine and surfactant solution;

(b) varying the concentrations of the first and second surfactants, respectively, in said solution and repeating step (a) until said predetermined solubilization is provided in a range of concentration of said first surfactant and said second surfactant which forms said microemulsion; and, (c) mixing said first surfactant and said second surfactant in a concentration of said first surfactant and said second surfactant having said predetermined solubilization in the aqueous phase of a cement slurry; and (d) circulating said cement slurry into a well.

16. The method of claim 1 wherein the second surfactant is a linear ethoxylated alcohol.

17. The method of claim 1 wherein the second surfactant is an ethoxylated alcohol having an alkyl chain length from $C_9$ to $C_{11}$.

* * * * *